US010503895B2

(12) United States Patent
Chen

(10) Patent No.: US 10,503,895 B2
(45) Date of Patent: Dec. 10, 2019

(54) RUNTIME NON-INTRUSIVE CONTAINER SECURITY INTROSPECTION AND REMEDIATION

(71) Applicant: Red Hat, Inc., Raleigh, NC (US)

(72) Inventor: Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 221 days.

(21) Appl. No.: 15/484,621

(22) Filed: Apr. 11, 2017

(65) Prior Publication Data

US 2018/0293374 A1 Oct. 11, 2018

(51) Int. Cl.
*G06F 21/53* (2013.01)
*G06F 9/455* (2018.01)

(52) U.S. Cl.
CPC .......... *G06F 21/53* (2013.01); *G06F 9/45558* (2013.01); *G06F 2009/45562* (2013.01); *G06F 2009/45587* (2013.01); *G06F 2009/45595* (2013.01)

(58) Field of Classification Search
CPC ................ G06F 21/53; G06F 9/45558; G06F 2009/45562; G06F 2009/45587; G06F 2009/45595
See application file for complete search history.

(56) References Cited

U.S. PATENT DOCUMENTS

| 9,239,846 | B2 | 1/2016 | Besen et al. | |
|---|---|---|---|---|
| 2005/0257265 | A1* | 11/2005 | Cook | G06F 21/53 726/23 |
| 2006/0136720 | A1 | 6/2006 | Armstrong et al. | |
| 2017/0093923 | A1* | 3/2017 | Duan | H04L 63/1408 |
| 2018/0129821 | A1* | 5/2018 | Havewala | G06F 3/0644 |
| 2018/0139238 | A1* | 5/2018 | Schultz | G06F 21/6254 |

FOREIGN PATENT DOCUMENTS

WO 2008/014614 A1 2/2008

OTHER PUBLICATIONS

Introducing lxc-snap, May 6, 2013 (7 pages).
(Continued)

*Primary Examiner* — Daniel B Potratz
*Assistant Examiner* — William B Jones
(74) *Attorney, Agent, or Firm* — K&L Gates LLP

(57) ABSTRACT

Runtime non-intrusive container security introspection and remediation is disclosed. For example, a persistent storage associated with a container has a write protected lower system layer and an upper system layer, and a first snapshot of the upper system layer is created. A first request to modify data in the persistent storage is detected. A first requested modification is forwarded to a security inspection service. A threat state of the container based is determined on the first requested modification, where the threat state is one of a threatening state and a non-threatening state. In response to determining that the container is in the non-threatening state, the container is notified that the first requested modification is non-threatening and a second snapshot of the upper system layer is created. In response to determining that the container is in the threatening state, a container engine is instructed to respond to the threatening state.

19 Claims, 7 Drawing Sheets

(56) References Cited

OTHER PUBLICATIONS

Tools to Track Registry and File System Changes, Malware Tips, Sep. 9, 2014 (6 pages).
Galal, Hussein, Using Overlayfs With LXC, Nov. 6, 2014 (7 pages).
Giannakopoulos et al., Recovering from Cloud Application Deployment Failures through Re-execution, 2nd International Workshop on Algorithmic Aspects of Cloud Computing (ALGOCLOUD 2016), in conjunction with the ALGO 2016 Conference, Aug. 22, 2016, Aarhus, Denmark (13 pages).

* cited by examiner

US 10,503,895 B2

1

RUNTIME NON-INTRUSIVE CONTAINER SECURITY INTROSPECTION AND REMEDIATION

BACKGROUND

The present disclosure generally relates to improving network security threat detection and response in cloud environments hosting containers. Typically, a multi-tenant cloud provider hosts many virtual machines ("VMs") belonging to many different tenants, which in turn host many different applications including applications further virtualized in containers. Isolated guests such as VMs and containers may allow a programmer to quickly scale the deployment of applications to the volume of traffic requesting the applications. Isolated guests may be deployed in a variety of hardware environments. There may be economies of scale in deploying hardware in a large scale. A cloud provider may rent or sell excess computing capacity on extra hardware deployed to, for example, achieve per unit cost savings on hardware, or for the express purpose of creating a revenue stream from such rentals. A programmer may hire one or more cloud providers to provide contingent space for situations where the programmer's applications may require extra compute capacity, becoming a tenant of the cloud provider. A tenant may flexibly launch more or less copies of isolated guests to scale their applications and services in response to the ebb and flow of traffic. Typically, a container is significantly lighter weight than a VM, and may be hosted in a VM, allowing for additional flexibility and scalability of deployment.

SUMMARY

The present disclosure provides a new and innovative system, methods and apparatus for runtime non-intrusive container security introspection and remediation. In an example, a first snapshot of an upper system layer of a persistent storage associated with a container is created where the persistent storage includes a lower system layer, which is write protected, and the upper system layer. A request by the container to modify data in the persistent storage is detected, and a requested modification is forwarded to a security inspection service. A threat state of a container based is determined on the first requested modification, where the threat state is a threatening state or a non-threatening state. In response to determining that the container is in the non-threatening state, the container is notified that the first requested modification is non-threatening and a second snapshot of the upper system layer is created. In response to determining that the container is in the threatening state, a container engine is instructed to respond to the threatening state.

Additional features and advantages of the disclosed method and apparatus are described in, and will be apparent from, the following Detailed Description and the Figures.

2

Figure 3:
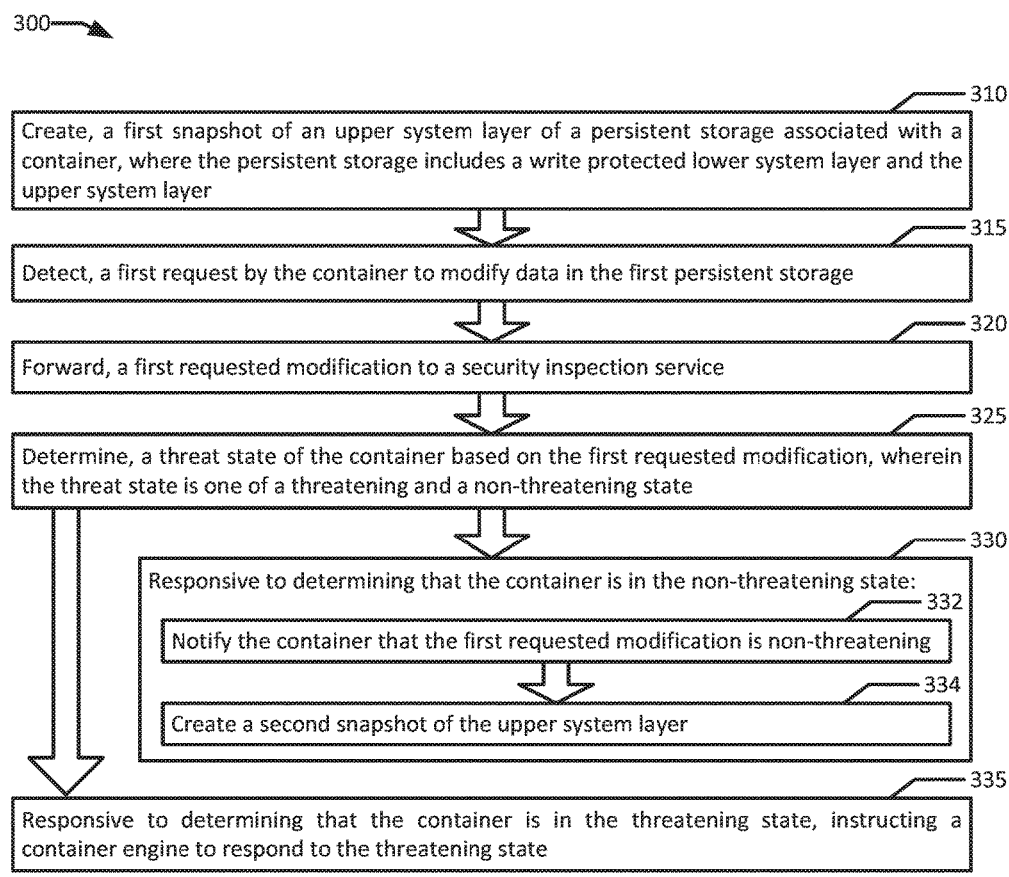

FIG. 3 is a flowchart illustrating an example of runtime non-intrusive container security introspection and remediation according to an example of the present disclosure.

Figure 4A:
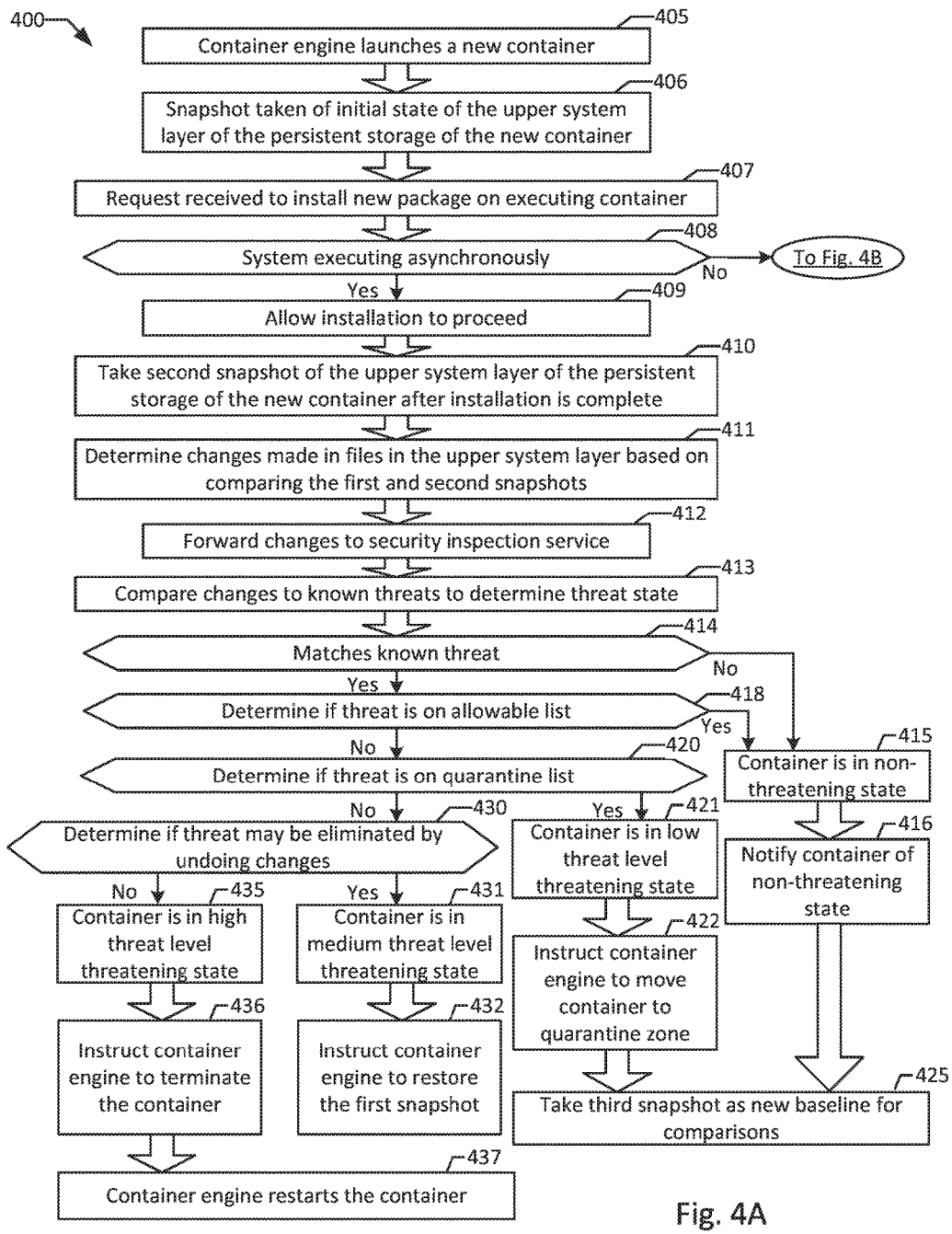
Figure 4B:
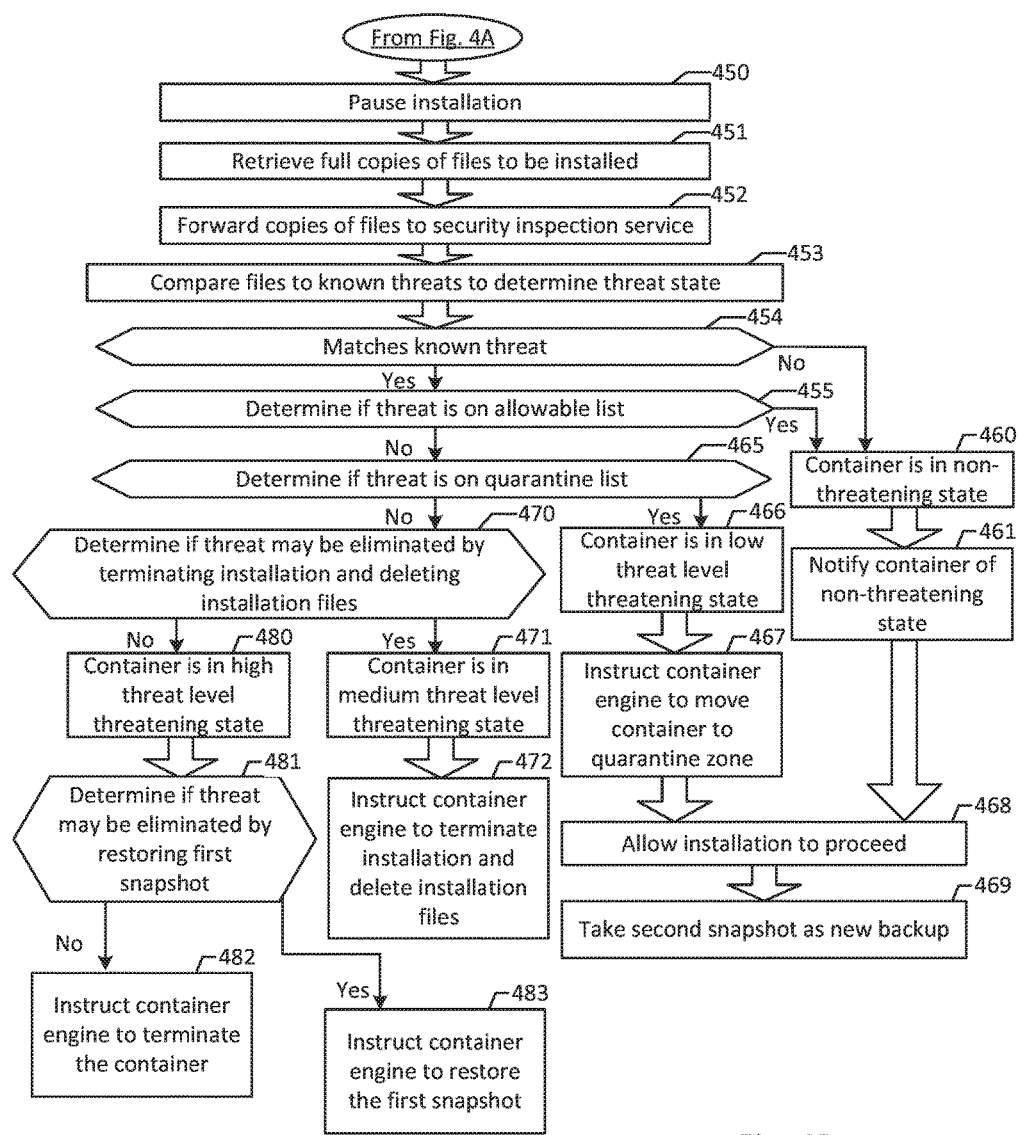

FIGS. 4A and 4B are flow charts illustrating an example runtime non-intrusive container security introspection and remediation system according to an example of the present disclosure.

Figure 5:
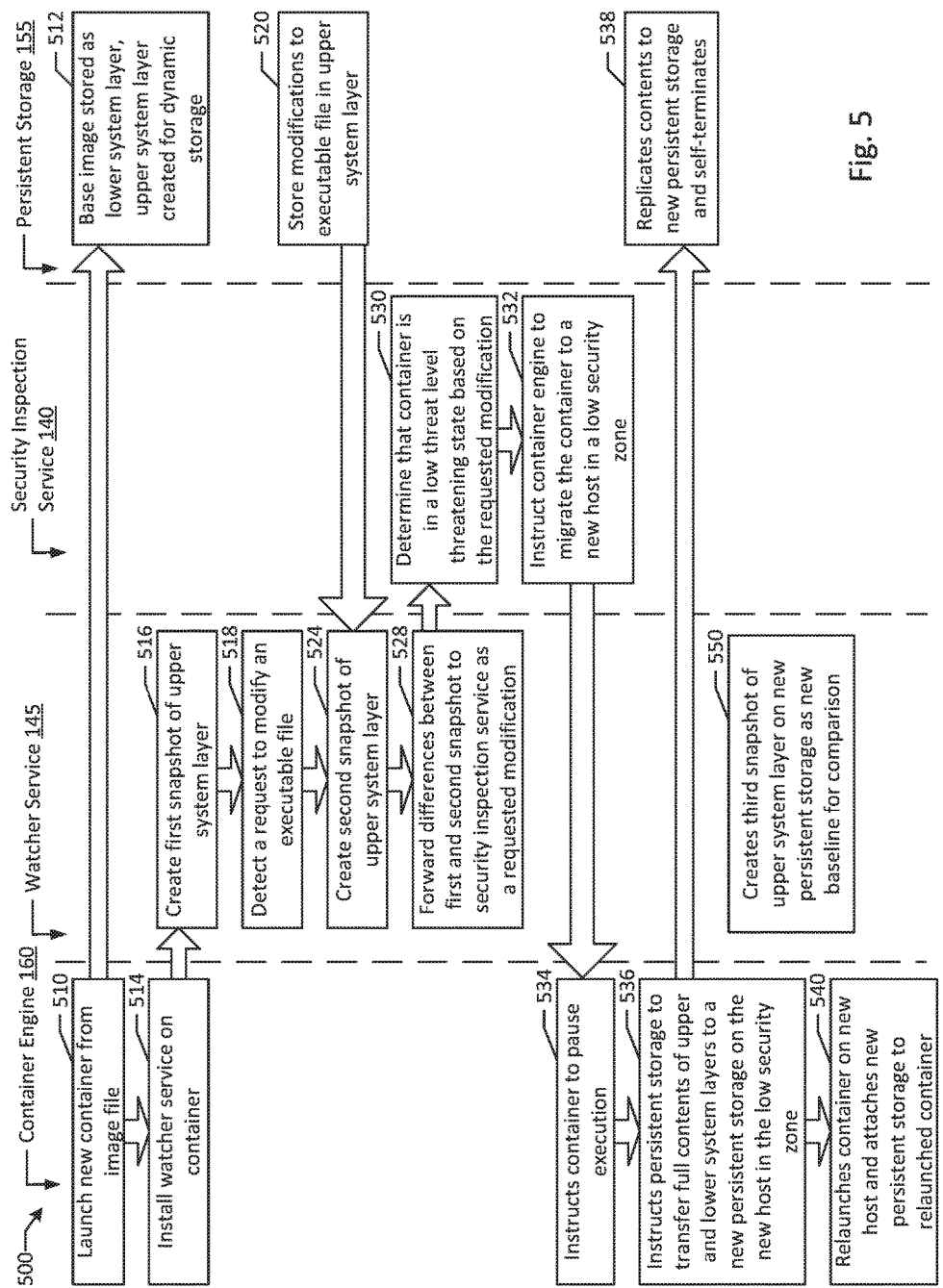

FIG. 5 is a flow diagram of an example of the detection and remediation of a security threat by security introspection and remediation according to an example of the present disclosure.

Figure 6:
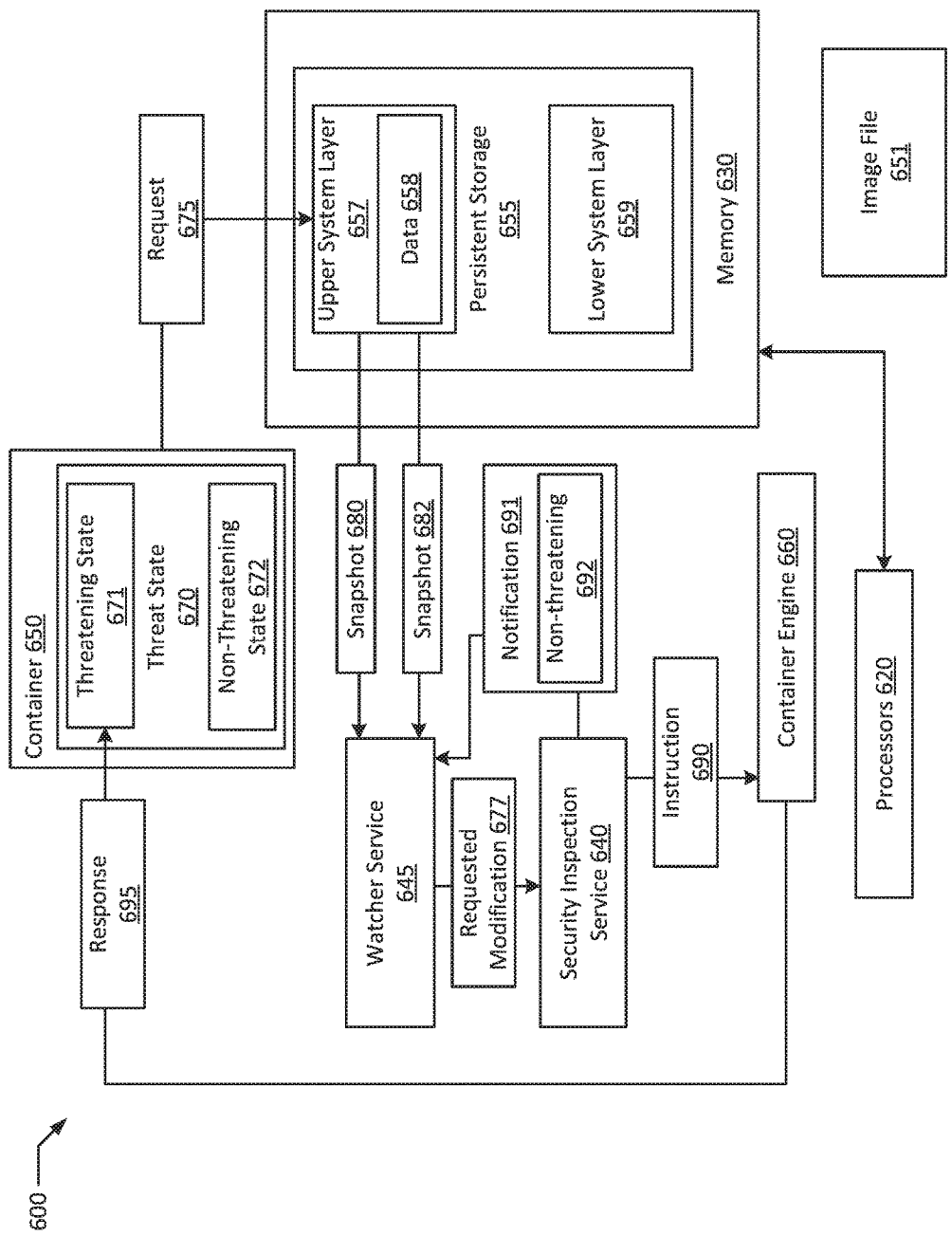

FIG. 6 is a block diagram of an example security introspection and remediation system according to an example of the present disclosure.

DETAILED DESCRIPTION OF EXAMPLE EMBODIMENTS

In computer systems, isolated guests such as virtual machines may be used for creating hosting environments for running application programs. In an example, a programmer may use a container based virtualization system such as Red Hat® OpenShift® or Docker®, or a system where stand alone virtualized operating systems are created including the use of a hypervisor. To provide access to the applications hosted on the virtual machines or containers to the public, the public IP addresses of these isolated guests may be available for public access, possibly presenting avenues for malicious actors to exploit these applications, potentially resulting in damage to these virtual machines or containers hosting the applications, including possibly allowing these isolated guests to be taken over by the malicious actors. In an example, multiple applications and/or isolated guests owned by the same programmer or tenant on a public cloud may have elevated access to other applications and/or isolated guests owned by the same tenant. After breaching the security on one application and/or isolated guest, a malicious actor could in turn more easily attack other components owned by the same tenant.

Cloud providers and their tenants may both implement security measures to prevent and/or limit damage caused by malicious actors. One part of the overall security package implemented by cloud providers and tenants is typically some form of security threat scanner such as a virus and/or malware scanner. A typical drawback of security threat scanners is that they tend to be large, storage intensive and processor intensive applications that add significant overhead to a deployment. Therefore, in many isolated guests, and especially in containers, security threat scanners are normally not included because containers tend to be stripped of any components unnecessary for the operation of the guest's or container's intended purpose. In part, to add a bulky and inefficient component like a security threat scanner to a container may defeat the purpose of containerized virtualization by increasing the startup time of the container and thereby reducing the flexibility offered from scaling the deployment of containers on demand. In addition, by multiplying the number of security threat scanners deployed, significant processor resources may be required by the security threat scanners to execute adding significant overhead to the cloud environment as a whole with potentially little gain. As such, in a typical deployment, image files that form the templates used to launch containers may be regularly scanned for security threats, but once a container is launched and independently executing, additional scans of the operating file system of the container are not typically performed. As many containers are deployed to host network facing services and microservices, there is a significant threat that a malicious actor may infect an executing container without detection for a relatively prolonged period. The threat is mitigated somewhat by the isolated nature of containers (e.g., an infected container does not necessarily provide a route for infecting other systems), but a lot of damage may result from a malicious actor co-opting even one service (e.g., intercepting credit card numbers from a payment system).

The present disclosure aims to address problems with deficiencies in the detection of and response to security threats in containers hosted in both public and private clouds by introducing runtime non-intrusive container security introspection and remediation. For example, a container's persistent storage may be hosted on a file system that supports a layered structure such as OverlayFS. The persistent storage may be split into a read only lower system layer (e.g., an OverlayFS lower filesystem layer) that contains the core container build from an image file, and an upper system layer (e.g., an OverlayFS upper filesystem layer) that is writeable to store data generated through the execution of the container. In an example, a watcher service can execute to take snapshots of the upper system layer, and generate deltas based on comparing two snapshots. The generated delta is then a modification to the system files that can be forwarded to an external security inspection service, which may be a virus and/or malware scanner. The watcher service may be configured to balance performance with security. If a threat is detected, a container engine that is configured to launch and manage containers may be instructed to remediate the threat based on a variety of configured threat levels. Configured for a typical level of security consciousness, runtime non-intrusive container security introspection and remediation may detect and remediate a majority of typical threats with barely detectable impact on the execution of a container's intended purpose (e.g., hosting a service or microservice) in part due to the majority of the threat detection process occurring outside of the container.

Figure 1:
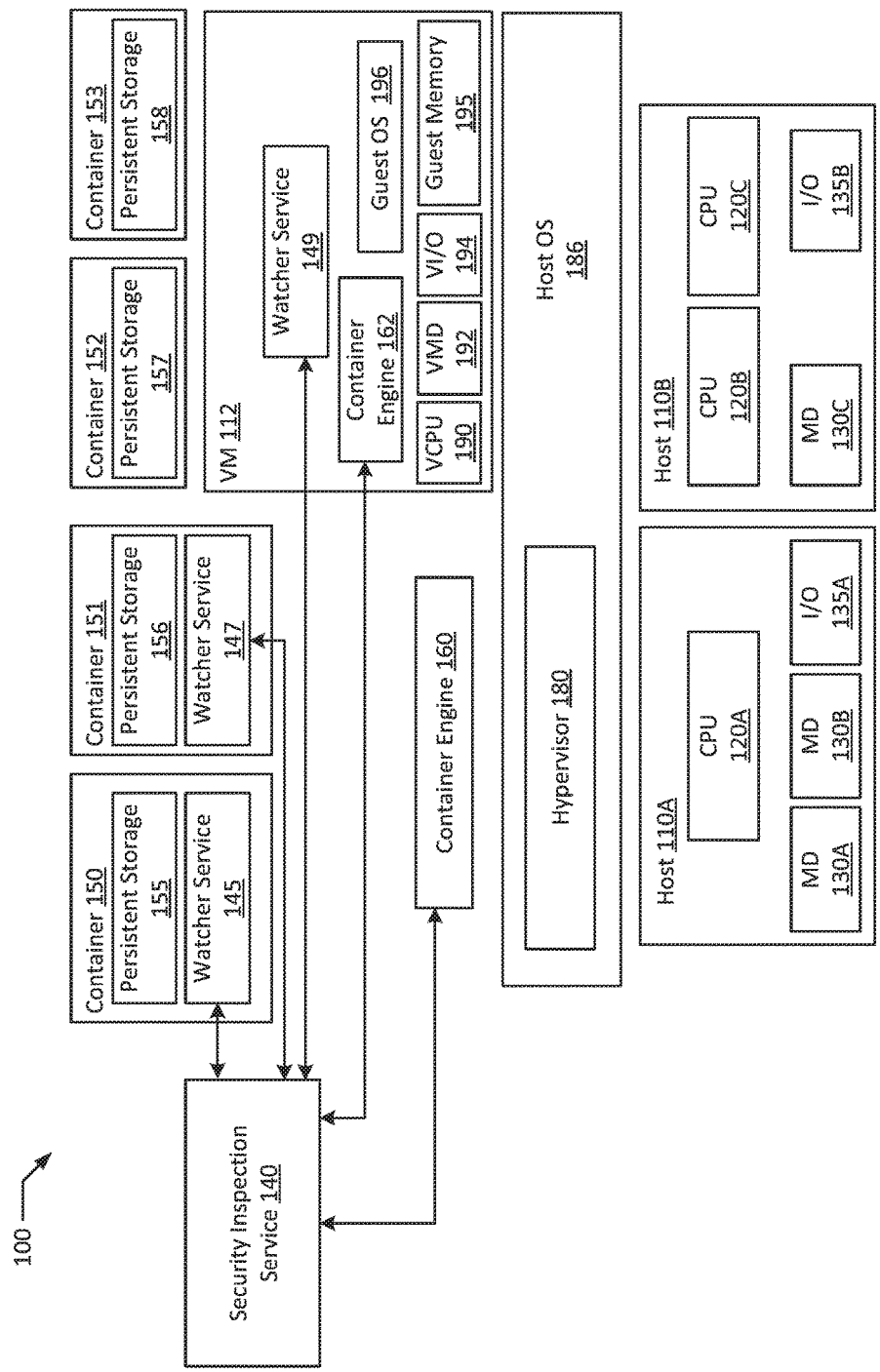
FIG. 1 is a block diagram of a runtime non-intrusive container security introspection and remediation system according to an example of the present disclosure.

FIG. 1 is a block diagram of a runtime non-intrusive container security introspection and remediation system according to an example of the present disclosure. The system 100 may include one or more interconnected hosts 110A-B. Each host 110A-B may in turn include one or more physical processors (e.g., CPU 120A-C) communicatively coupled to memory devices (e.g., MD 130A-C) and input/output devices (e.g., I/O 135A-B). As used herein, physical processor or processors 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 135A-B refers to a device capable of providing an interface between one or more processor pins and an external device, the operation of which is based on the processor inputting and/or outputting binary data. Processors (Central Processing Units "CPUs") 120A-C may be interconnected using a variety of techniques, ranging from a point-to-point processor interconnect, to a system area network, such as an Ethernet-based network. Local connections within each host 110A-B, including the connections between a processor 120A and a memory device 130A-B and between a processor 120A and an I/O device 135A may be provided by one or more local buses of suitable architecture, for example, peripheral component interconnect (PCI).

In an example, hosts 110A-B may run one or more isolated guests, for example, containers 150, 151, 152, 153 and VM 112. In an example, any of containers 150, 151, 152, and 153 may be a container using any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a cluster that may be deployed together (e.g., in a Kubernetes® pod). In an example, a given service may require the deployment of multiple containers and/or pods in multiple physical locations. In an example, containers 152 and 153 may execute on VM 112. In an example, containers 150 and 151 may be executing directly on either of hosts 110A-B without a virtualized layer in between. In an example, container engine 160 may execute directly on host operating system ("OS") 186, while container engine 162 may execute on guest OS 196. In an example, container engines 160 and 162 may be applications that schedule, launch, and/or manage containers (e.g., containers 150, 151, 152, and 153).

System 100 may run one or more VMs (e.g., VM 112), by executing a software layer (e.g., hypervisor 180) above the hardware and below the VM 112, as schematically shown in FIG. 1. In an example, the hypervisor 180 may be a component of the host operating system 186 executed by the system 100. In another example, the hypervisor 180 may be provided by an application running on the operating system 186, or may run directly on the hosts 110A-B without an operating system beneath it. The hypervisor 180 may virtualize the physical layer, including processors, memory, and I/O devices, and present this virtualization to VM 112 as devices, including virtual processors 190, virtual memory devices 192, virtual I/O devices 194, and/or guest memory 195. In an example, a container may execute directly on host OS 186 without an intervening layer of virtualization, such as containers 150 and 151.

In an example, a VM 112 may be a virtual machine and may execute a guest operating system 196 which may utilize the underlying virtual central processing unit ("VCPU") 190, virtual memory device ("VMD") 192, and virtual input/output ("VI/O") devices 194. One or more containers that may host services (e.g., containers 152 and 153) may be running on a VM 112 under the respective guest operating system 196. Processor virtualization may be implemented by the hypervisor 180 scheduling time slots on one or more physical processors 120A-C such that from the guest operating system's perspective those time slots are scheduled on a virtual processor 190.

A VM 112 may run on any type of dependent, independent, compatible, and/or incompatible applications on the underlying hardware and host operating system 186. In an example, containers 152 and 153 running on VM 112 may be dependent on the underlying hardware and/or host operating system 186. In another example, containers 152 and 153 running on VM 112 may be independent of the underlying hardware and/or host operating system 186. In an example, containers 152 and 153 running on VM 112 may be compatible with the underlying hardware and/or host operating system 186. Additionally, containers 152 and 153 running on VM 112 may be incompatible with the underlying hardware and/or OS. The hypervisor 180 may manage memory for the host operating system 186 as well as memory allocated to the VM 112 and guest operating systems 196 such as guest memory 195 provided to guest OS 196. In an example, persistent storage 157 associated with container 152 and/or persistent storage 158 associated with container 153 may be allocated from virtual memory device 192 and/or guest memory 195. In another example, persistent storage 157 associated with container 152 and/or persistent storage 158 associated with container 153 may be hosted in a separate persistent memory device, whether virtualized or physical (e.g., memory devices 130A-C). In an example, containers 150 and 151 may be functionally similar to containers 152 and 153, but containers 150 and 151 may execute directly on host OS 186. In the example, persistent storage 155 associated with container 150 and/or persistent storage 156 associated with container 151 may be hosted on memory devices 130A-C. In another example, persistent storage 155 associated with container 150 and/or persistent storage 156 associated with container 151 may be hosted remotely from hosts 110A-B, for example over a network in a storage node. In an example, containers 150 and 151 are launched and/or managed by container engine 160, while containers 152 and 153 are launched and/or managed by container engine 162. In an example, container engines 160 and 162 may be a component part of a container orchestrator 145 such as Kubernetes® or Docker Swarm®. In other examples, container engines 160 and 162 may be stand alone components. In some examples, container engine 160, security inspection service 140, watcher service 145, container 150, and hosts 110A-B may reside over a network from each other, which may be, for example, a public network (e.g., the Internet), a private network (e.g., a local area network (LAN) or wide area network (WAN)), or a combination thereof.

In an example, security inspection service 140 may be any software or hardware component capable of identifying a security risk from a data input. In an example, security inspection service 140 may be hosted on another isolated guest on hosts 110A-B. In another example, security inspection service 140 may be hosted across a network from hosts 110A-B. In an example, security inspection service 140 may receive inputs from watcher services 145, 147, and 149 to be analyzed for threats. In an example, watcher service 145 is associated with container 150, watcher service 147 is associated with container 151, and watcher service 149 is associated with containers 152 and 153. In the example, watcher services 145, 147, and 149 may monitor changes in file systems (e.g., persistent storages 155, 156, 157, and 158) associated with the respectively associated containers 150, 151, 152, and 153. In an example, a watcher service may execute on the container the watcher service is monitoring (e.g., watcher service 145 and container 150). In another example, a watcher service 149 may execute on a VM 112 that hosts containers 152 and 153, and watcher service 149 may remotely monitor containers 152 and 153. In an example, multiple watcher services 145, 147, and 149 communicate with and are associated with a single security inspection service 140. In the example, security inspection service 140 may have threat definitions for detecting security threats updated without modifying any of watcher services 145, 147, and 149, or modifying any of containers 150, 151, 152, and 153 associated with the watcher services. In an example, independent updates to a shared security inspection service 140 may save significantly on maintenance overhead as compared to updating a plurality of containers and watcher services.

In an example, persistent storages 155, 156, 157, and 158 are implemented on a file system that supports layering (e.g., OverlayFS). In the example, the file system of each persistent storage (e.g., persistent storages 155, 156, 157, and 158) may appear as one unified persistent storage to applications executing on containers 150, 151, 152, and 153 respectively associated with persistent storages 155, 156, 157, and 158. However, in an example, persistent storages 155, 156, 157, and 158 may actually include two or more layers, including at least a lower base-build layer that includes the core files required to execute a container, and an upper dynamic layer for storing any changes from the base-build as the container executes. In an example, data in the lower layer is never overwritten while a container is executing. In an example, a multi-layer system may include multiple upper layers, accessible and/or writeable by different accounts, groups of accounts, and/or permission levels.

Figure 2:
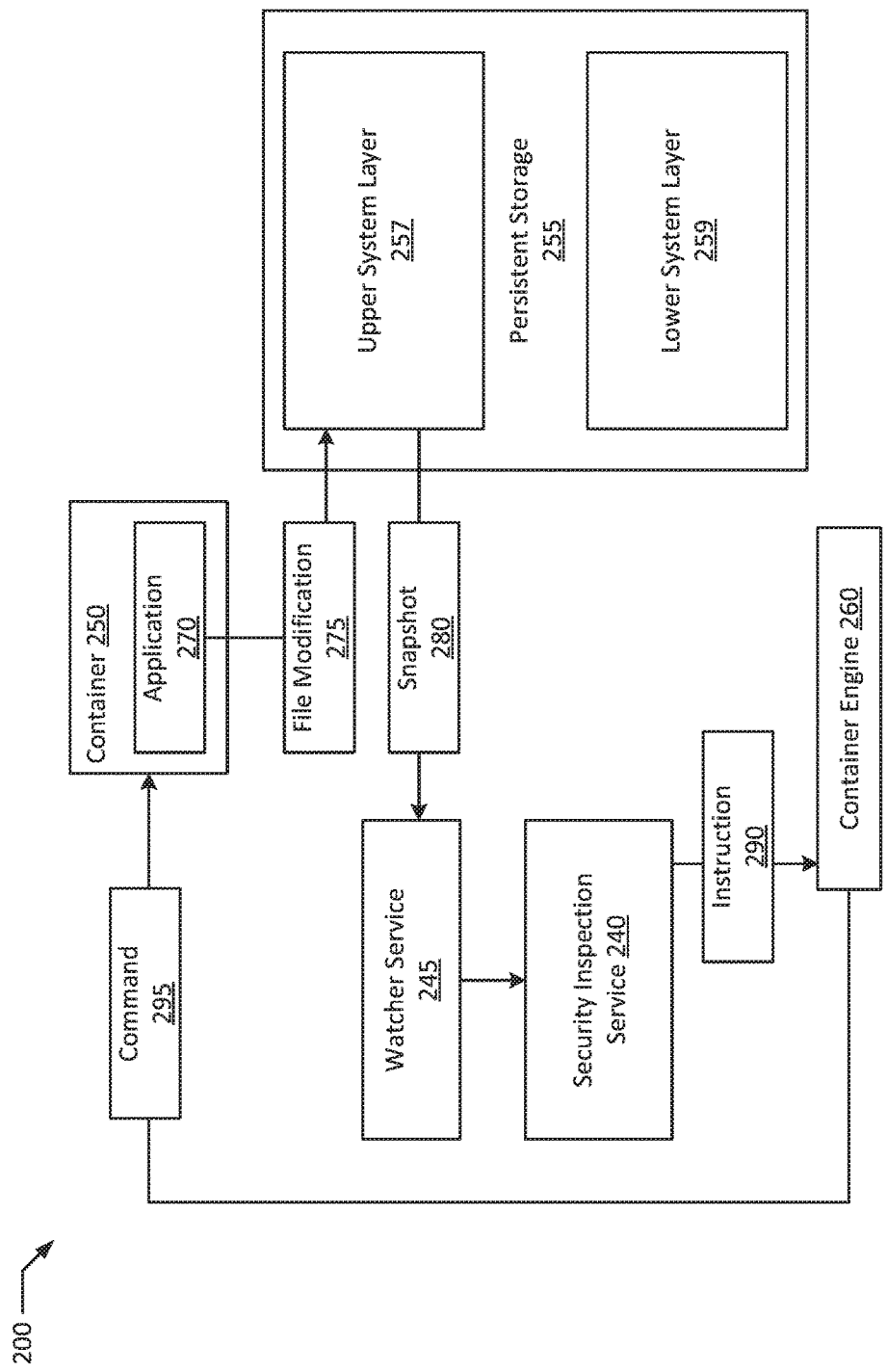
FIG. 2 is a block diagram illustrating an example of a flow of instructions in a runtime non-intrusive container security introspection and remediation system according to an example of the present disclosure.

FIG. 2 is a block diagram illustrating an example of a flow of instructions in a runtime non-intrusive container security introspection and remediation system according to an example of the present disclosure. In an example, container 250 is executing application 270. In the example, container 250 is associated with persistent storage 255, which includes upper system layer 257 and lower system layer 259. In an example, application 270 may make changes to upper system layer 257 (e.g., by requesting file modification 275). In an example, persistent storage 255 may be configured such that file modification 275 acts on a second copy of a file from lower system layer 259, saving the changed file in upper system layer 257 while the original copy is still preserved in lower system layer 259. In an example, only the changed, upper system layer copy of the file would appear to be present in persistent storage 255 from the perspective of application 270.

In an example, watcher service 245 may take periodic snapshots (e.g., snapshot 280) of the data in upper system layer 257. In the example, watcher service 245 may compare snapshots to compile modifications done to upper system layer 257 (e.g., file modification 275). In an example, watcher service 245 may forward file modification 275 to security inspection service 240 for analysis to determine whether file modification 275 places container 250 in a threatening state. In the example, based on the analysis regarding file modification 275 showing that file modification 275 places container 250 in a threatening state with a medium threat level, security inspection service 240 may issue instruction 290 to a container engine 260 (e.g., to roll back file modification 275). In an example, container engine 260 may then issue command 295 to container 250, command 295 being a trigger to restore upper system layer 257 to a version from a previous snapshot taken by the watcher service 245.

FIG. 3 is a flowchart illustrating an example of runtime non-intrusive container security introspection and remediation according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a watcher service 245 and a security inspection service 240.

A first snapshot of an upper system layer of a persistent storage associated with a container is created, where the persistent storage includes a lower system layer, which is write protected, and the upper system layer (block 310). In an example, watcher service 245 creates a snapshot 280 of upper system layer 257, which is a part of persistent storage 255. In the example, persistent storage 255 is a storage volume storing files and/or data for a container 250 that includes both upper system layer 257 and lower system layer 259, where lower system layer 259 is write protected. In an example, lower system layer 259 includes files copied from an image file from which container 250 was constructed and/or launched. In an example, persistent storage 255 may include additional system layers, for example, system layers corresponding to different levels of permissions. In an example, different accounts may write to different instances of the upper system layer (e.g., each account's upper system layer is independently built upon lower system layer 259). In an example, multiple accounts (e.g., grouped accounts) may share the same upper system layer 257. In an example, snapshot 280 may be a snapshot of the entire contents of upper system layer 257. In another example, snapshot 280 may be an incremental snapshot that only includes files changed since a previous snapshot was taken. In an example, snapshot 280 may be limited in scope covering only a subset of the files in upper system layer 257. In an example, a change to a file outside of a subset of monitored files may be ignored by watcher service 245. In the example, the subset of the files captured by snapshot 280 may be configured based on a threat tolerance level. For example, certain directories such as swap space and temp space may be updated very rapidly, and the overhead of monitoring such directories in real-time may be deemed too costly. In such an example, watcher service 245 may be configured to take snapshots that only cover certain key directories (e.g., /var, /usr, /bin, /sbin, /etc). Alternatively, watcher service 245 may take snapshots of the entire upper system 257, but may only actively monitor key directories in real time, and may only periodically monitor other files and directories.

A first request by the container to modify data in the first persistent storage is detected (block 315). In an example, watcher service 245 detects that container 250 is requesting to modify data in persistent storage 255. In various examples, container 250 and watcher service 245 may allow changes to upper system layer 257 to be committed synchronously or asynchronously. For example, in a synchronous system, a modification to upper system layer 257 may first be validated by security inspection service 240 prior to being written to upper system layer 257, therefore ensuring no known threats are written to persistent storage 255. In an asynchronous system, watcher service 245 may detect a change to upper system layer 257 after the change has already been made, and the system may reactively handle any security threats that may have already been introduced. Partially synchronous systems may also be used, where changes to key directories (e.g., /var, /usr, /bin, /sbin, /etc) are validated before being committed while most other changes are handled asynchronously.

In a typical example, a system 200 may operate asynchronously. In such an example, a first requested modification (e.g., file modification 275) may be requested (e.g., by application 270 on container 250). In an example, application 270 may be an installer such as Yellowdog Updater, Modified ("YUM"), and file modification 275 may be a new executable file being installed. In another example, application 270 may be a network driver, and file modification 275 may be an update to the network driver. In the example, watcher service 245 may have taken a baseline snapshot of upper system layer 257 when container 250 was first launched. After file modification 275 is written to upper system layer 257, watcher service 245 may take a snapshot 280 of upper system layer 257 and compare the contents of snapshot 280 to the original baseline snapshot. By analyzing any changes between the original baseline snapshot and snapshot 280, watcher service 245 may reconstruct the changes incorporated in file modification 275. In an example, watcher service 245 may take snapshots periodically based on time. In another example, watcher service 245 may be triggered to take a snapshot for comparison. For example, container 250 may be configured to notify watcher service 245 whenever a change is being made to a file, or to a file within a key directory. In the example, monitored files and/or key directories may be configured to send alerts on modification through utilities such as File Alteration Monitor ("FAM"), Gamin, Dnotify, and/or Inotify. In another example, watcher service 245 may be configured to detect input/output activity in persistent storage 255.

In an example where system 200 operates synchronously, file modification 275 would not be saved to upper system layer 257 without first receiving a clean bill of health. In such an example, file modification 275 may first be stored in a temporary buffer that is forwarded to watcher service 245 upon receipt of the request to modify persistent storage 255. For example, a user may trigger an executable file that will make changes to upper system layer 257. Prior to the changes being saved, container 250 and/or persistent storage 255 may intercept the changes and forward them to watcher service 245 for preliminary analysis. In an example, container 250 and/or persistent storage 255 may maintain a queue of pending changes to hold proposed changes to be security scanned before being written to upper system layer 257. In an example, file modification 275 may be written to upper system layer 257 after container 250 is notified that file modification 275 is non-threatening. For example, watcher service 245 may trigger file modification 275 to be released from the holding queue and to be written to upper system layer 257 after file modification 275 is cleared by security inspection service 240.

A first requested modification is forwarded to a security inspection service (block 320). In an example, file modification 275 is forwarded to security inspection service 240 by watcher service 245. In various examples, file modification 275 may be directly forwarded to watcher service 245 for security inspection by container 250 and/or persistent storage 255, or file modification 275 may be reconstructed by watcher service 245 based on comparing snapshots. In an example, a second and a third request to modify persistent storage 255 may be received by container 250 prior to watcher service 245 receiving results (e.g., a threat state) from security inspection service 240 regarding file modification 275. In an example, watcher service 245 may combine a second requested modification and a third requested modification into a unified fourth requested modification to send to security inspection service 240 for security analysis. For example, in an asynchronous system, watcher service 245 may be unaware of the second and the third requested modifications being two separate modification events if both the second and the third requested modification are written to upper system layer 257 prior to the watcher service 245 taking another snapshot after snapshot 280. In such an example, all of the cumulative changes may be captured by watcher service 245 together. In an synchronous system, each requested modification may be forwarded to watcher service 245 as the request is received, but watcher service 245 may be configured to package together bundles of changes (e.g., all changes for the past 10 seconds) before sending them to security inspection service 240 for inspection. In an example, watcher service 245 may be configured to only have one outstanding security inspection request with security inspection service 240, and may therefore package together all changes that occur while a given modification (e.g., file modification 275) is out for inspection to be sent together until after a result of the inspection of file modification 275 is received. In another example, watcher service 245 may be configured to forward requested modifications to security inspection service 240 based on a timer (e.g., once every minute). In some examples, rather than sending modifications for verification immediately, a time window or a process monitor may be employed by watcher service 245 to capture subsequent changes related to the first change before sending an entire bundle of changes for verification. For example, a YUM installation may install several executables that are interrelated sequentially. In the example, watcher service 245 may wait for YUM to finish executing before capturing all of the changes for inspection together.

A threat state of the container is determined based on the first requested modification, where the threat state is either a threatening state or a non-threatening state (block 325). For example, security inspection service 240 may inspect file modification 275 for any known security threats. In an example, security inspection service 240 may compare the files in upper system layer 257 modified as a result of file modification 275 to security definitions loaded to the security inspection service 240. In an example, security inspection service 240 may determine file modification 275 to change container 250 to a threatening state if file modification 275 is deemed to be potentially malicious, or that container 250 may remain in a non-threatening state if file modification 275 is deemed to be non-threatening.

The container may be determined to be in the non-threatening state (block 330). In an example, security inspection service 240 may determine that file modification 275 is non-threatening based on a failure to detect any abnormality in file modification 275 (e.g., file modification 275 does not match any threat in the security definitions) or all of the detected abnormalities in file modification 275 are listed in a list of allowable abnormalities (e.g., potential security threats in the security definitions are triggered, but the triggered threats have been configured to be ignored). For example, legitimate software implementations may sometimes have similar behavior to some forms of malware and may therefore be flagged as potential security threats. An administrator may review these implementations and configure the security inspection service 240 to disregard similar subsequent warnings. In an example, security inspection service 240 may be configured to log and/or monitor such ignored threats.

Based on the container being in the non-threatening state, the container is notified that the first requested modification is non-threatening (block 332). In an example, security inspection service 240 may notify container 250 that file modification 275 is non-threatening. In an asynchronous system, container 250 may simply acknowledge the notification as file modification 275 may have already been written to upper system layer 257. In a synchronous system, container 250 and/or persistent storage 255 may proceed to commit writing file modification 275 upon receipt of the notification from security inspection service 240. In an example, security inspection service 240 may notify container 250 and/or persistent storage 255 directly. In another example, security inspection service 240 may notify container 250 and/or persistent storage 255 by having watcher service 245 relay a notification to container 250 and/or persistent storage 255.

Also, a second snapshot of the upper system layer is created (block 334). In an example, after file modification 275 is reported to be non-threatening by security inspection service 240, watcher service 245 may take an additional snapshot of upper system layer 257. In an example, the new snapshot may be a new baseline to compare subsequent changes to. In another example, snapshot 280 (e.g., the snapshot capturing the addition of file modification 275) may be used as a baseline for detecting subsequent changes to upper system layer 257. In an example, a new snapshot may be taken to detect any changes to upper system layer 257 that may have occurred while security inspection service 240 was inspecting file modification 275. In an asynchronous system, a first snapshot may be a baseline snapshot, a second snapshot may be one after file modification 275 is committed to upper system layer 257, and a third snapshot may be taken after a time period has elapsed post second snapshot to inspect any new changes as compared to the second snapshot. In a synchronous system, a new snapshot may be taken after file modification 275 is allowed to be committed to upper system layer 257 to create a new restore point in case any malicious code is introduced to container 250 after file modification 275 is committed.

In response to determining that the container is in the threatening state, a container engine is instructed to respond to the threatening state (block 335). In an example, upon detecting that file modification 275 has placed container 250 in a threatening state, security inspection service 240 may send instruction 290 to container engine 260 to respond to the threatening state. A response may be fore container engine 260 to send a termination command 295 to container 250, terminating container 250 and eliminating any threat. In an example, security inspection service may further classify a threat level of container 250 in the threatening state as one of low, medium, or high. For example, certain hypertext transfer protocol ("HTTP") cookies may be flagged as malware, but may be relatively benign threats. In an example, acting with an abundance of caution, security inspection service 240 may place container 250 into the threatening state for the detection of a relatively benign threat such as malware or an exploit in file modification 275. In such an example, security inspection service 240 may assign a low threat level for the threatening state of container 250 and may instruct container engine 260 of the low threat state. In an example, in response to container 250 being in a low threat threatening state, container engine 260 may allow the file modification 275 to be retained in upper system layer 257. Additionally, container engine 260 may issue a command 295 to migrate container 250 and/or persistent storage 255 to a new host, for example, in a quarantine zone. In an example, a container in the quarantine zone may have reduced access to secure systems and components in system 100. In an example, container 250 and/or persistent storage 255 may be terminated and relaunched in a new memory device, possibly on a different physical host. In an example, the new host for container 250 and/or persistent storage 255 after migration may be across a network from the previous host.

In an example, security inspection service 240 may assign a medium threat level to file modification 275, for example, due to the discovery of a rootkit, Trojan, or backdoor type of security threat in file modification 275. In such an example, container engine 260 may command container 250 to roll back any changes made to a state present in a snapshot without file modification 275. In an example, file modification 275 is discarded as a result of command 295 from container engine 260 to container 250. For example, in an asynchronous system, container 250 may be instructed to roll back the upper system layer 257 to a state stored in the original baseline snapshot taken by watcher service 245. In a synchronous system, container 250 may be instructed to discard file modification 275 and to not allow file modification 275 to be written to upper system layer 257.

In an example, security inspection service 240 may assign a high threat level to file modification 275, for example, due to the discovery of a virus or worm type of security threat in file modification 275. In such an example, command 295 from container engine 260 to container 250 may be to terminate container 250. In an example, terminating container 250 purges the contents of container 250 from memory. In an example, container 250 is sufficiently isolated by virtualization that upon termination, the security threat in file modification 275 is terminated as well. In some examples, upon detection of an elevated threat level (e.g., medium or high), security inspection service 240 and/or container engine 260 may request a security scan of the virtual and/or physical hosts of container 250. Additionally, security inspection service 240 and/or container engine 260 may request a security scan of part or all of the physical memory volume hosting persistent storage 255.

FIGS. 4A and 4B are flow charts illustrating an example runtime non-intrusive container security introspection and remediation system according to an example of the present disclosure. Although the examples below are described with reference to the flowchart illustrated in FIGS. 4A and 4B it will be appreciated that many other methods of performing the acts associated with FIGS. 4A and 4B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both.

In the example process 400, container engine 260 may be requested to launch a new container (e.g., container 250) (block 405). In an example, watcher service 245 may take a snapshot of the initial state of the upper system layer 257 of the persistent storage 255 of the new container 250 (block 406). In an example, execution of application 270 may result in a request that is received by container 250 to install a new package on executing container 250 (block 407). In an example, system 400 is executing asynchronously (block 408). The installation of the new package is then allowed to proceed (block 409). In an example, a second snapshot (e.g., snapshot 280) of the upper system layer of the persistent storage 255 of container 250 is taken by watcher service 245 after the installation is complete (block 410). In an example, watcher service 245 determines that changes have been made in files in the upper system layer 257 based on comparing the first baseline snapshot to snapshot 280 (block 411). In an example, the identified changes are forwarded to security inspection service 240 (block 412). In an example, security inspection service 240 compares the changes to known threats to determine a current threat state of container 250 (block 413). A determination may be made whether the changes match any known threat (block 414). Upon determining that the changes match no known threat, container 250 is determined to be in the non-threatening state (block 415). Similarly, the changes may match a known threat, but the known threat may be determined to be on an allowable list of threats (block 418). If all detected threats are on a list of allowable threats, the container 250 is again in the non-threatening state (block 415). The container 250 may then be notified of its non-threatening state (block 416). In an example, another snapshot is taken as a new baseline for the container after the container is deemed to be in the non-threatening state as a new baseline for comparisons (block 425).

In an example, it may be determined that the changes match a known threat and are not present on the allowable list (block 418). In the example, it may be determined whether the threat is on a quarantine list (block 420). If the threat is on a quarantine list, security inspection service 240 may determine that the container 250 is in a low threat level threatening state (block 421). In the example, security policy engine 240 may instruct container engine 260 to move container 250 to a quarantine zone (block 422). After the container 250 is moved to the quarantine zone, watcher service 245 may take another snapshot as a new baseline for comparisons of future changes (block 425). In an example, a snapshot may also be a system restore point for rolling back unwanted and/or threatening changes. In an example, the frequency of snapshots, as well as the number of snapshots retained, may be dictated by configuration settings and/or storage space limitations. For example, watcher service 245 may be configured to retain at most ten snapshots for container 250 after which earlier snapshots start being discarded. In an example, an original baseline snapshot for a new container may be retained for a potential quick reset to default container settings. In another example, a reset to default container settings may be achieved by using the image file the container is based on as a snapshot.

In an example, it may be determined that the changes may be threatening and not on a quarantine list or an allowable list, and therefore a determination may be made whether the threat may be eliminated by undoing the changes to upper system layer 257 (block 430). In an example, the changes may be undone to eliminate the threat, and therefore the container is in a medium threat level threatening state (block 431). In the example, the container engine 260 may be instructed by the security inspection service 240 to restore the first snapshot of the upper system layer 257 from before the change (block 432).

In another example, the threat may be determined to potentially still exist after rolling back the changes to a previous snapshot, and therefore container 250 may be determined to be in a high threat level threatening state (block 435). In an example, security inspection service 240 may then instruct container engine 260 to terminate container 250 (block 436). In an example, security inspection engine 240 and/or container engine 260 may further request validation that the threat has been eliminated by requesting security scanning of the hosts of container 250 and/or persistent storage 255. In an example, container engine 260 may restart container 250 after container 250 is terminated (block 437).

As illustrated in FIG. 4B, when a system is not executing asynchronously, security threats may be scanned for synchronously (e.g., for a high security system). For example, in process 401, when container 250 receives a request to install a new package, the installation is first paused (block 450). Container 250 may then be configured to retrieve full copies of each file to be installed for watcher service 245 (block 451). In an example, watcher service 245 may forward copies of the files to security inspection service 240 (block 452). Security inspection service 240 may then compare the files to known threats to determine a threat state and a threat level for container 250 (block 453). In an example, upon determining that the files match no known threat, container 250 is determined to be in the non-threatening state (block 460). Similarly, where the changes match a known threat, the known threat may be determined to be on an allowable list of threats (block 455). If all detected threats are on a list of allowable threats, the container 250 is again in the non-threatening state (block 460). The container 250 may then be notified of its non-threatening state (block 461). In an example, the paused installation is then allowed to proceed and modify upper system layer 257 (block 468). In an example, another snapshot is taken by watcher service 245 after installation is complete to serve as a new backup restore point for container 250 (block 425).

In an example, it may be determined that the files may match a known threat that is not present on the allowable list (block 455). In the example, it may be determined whether the threat is on a quarantine list (block 465). If the threat is on a quarantine list, security inspection service 240 may determine that the container 250 is in a low threat level threatening state (block 466). In the example, security policy engine 240 may instruct container engine 260 to move container 250 to a quarantine zone (block 467). After the container 250 is moved to the quarantine zone, the paused installation is then allowed to proceed and modify upper system layer 257 (block 468). In an example, another snapshot is taken by watcher service 245 after installation is complete to serve as a new backup restore point for container 250 (block 425).

In an example, if it is determined that a security threat detected in the installation files is not on the quarantine list, a determination may be made whether the threat may be eliminated by terminating the installation and deleting the installation files (block 470). If the threat can be eliminated by terminating the installation and deleting the installation files, the container 250 may be in a medium threat level threatening state (block 471). In an example, security inspection service 240 may instruct container engine 260 to command container 250 to terminate the installation and delete the installation files (block 472). In an example, after terminating the installation and deleting the installation files, watcher service 245 may be instructed to take another snapshot to determine whether any vestiges of the security threat remain.

In an example, a determination may be made that the threat may not be eliminated by terminating installation and deleting the installation files, resulting in container 250 being in a high threat level threatening state (block 480). In such an example, a determination may be made whether restoring an earlier snapshot (e.g., the baseline startup snapshot or an earlier snapshot after a non-threatening state determination) may eliminate the threat (block 481). In an example, if restoring a previous snapshot would not eliminate the threat, container engine 260 may be instructed by security inspection service 240 to terminate container 250 (block 482). If restoring a previous snapshot may eliminate the threat, container engine 260 may be instructed by security inspection service 240 to restore the previous snapshot (block 483). In an example, regardless of the selected remediation method, after the detection of a high threat level threatening state, security inspection engine 240 and/or container engine 260 may further request validation that the threat has been eliminated by requesting security scanning of the hosts (e.g., a VM and/or physical host) of container 250 and/or persistent storage 255.

FIG. 5 is a flow diagram of an example of the detection and remediation of a security threat by security introspection and remediation according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 500, a container engine 160, a watcher service 145, and a security inspection service 140 perform runtime non-intrusive container security introspection and remediation on modifications to a persistent storage 155. In an example, container engine 160, watcher service 145, security inspection service 140 and persistent storage 155 are associated with a container 150.

In an example, container engine 160 launches a new container 150 from an image file (block 510). In the example, a base image of container 150 is stored as a lower system layer of persistent storage 155 that is write protected, and an upper system layer is created for dynamic storage of data generated in the execution of container 150 (block 512). In an example, container engine 160 installs watcher service 145 on container 150 (block 514). In an example, watcher service 145 may be included in the image file for container 250. In another example, container engine 160 may be configured to add a watcher service 145 to containers launched by container engine 160. In some examples, watcher service 145 may be installed in the lower system layer of persistent storage 155. In other examples, watcher service 145 may be installed in the upper system layer of persistent storage 155. In an example, after installation, watcher service 145 may create a first snapshot of the upper system layer (block 516). In examples where watcher service 145 is installed in the upper system layer, the original baseline snapshot taken of the upper system layer by watcher service 145 may include the files for watcher service 145, thereby avoiding security scanning of the files for watcher service 145.

In an example, watcher service 145 may detect a request to modify an executable file (block 518). In some examples, watcher service 145 may be configured to monitor all changes to the upper system layer of persistent storage 155. In other examples, watcher service 145 may be configured to monitor changes to specific files in persistent storage 155, or specific classes of files (e.g., executable files). In an example, persistent storage 155 first stores the requested modifications to the executable file in the upper system layer (block 520). In the example, container 150 may detect the modified upper system layer copy of the executable file as the only copy of the executable file. In an example, a copy of the executable file installed from the base image of container 250 may still reside in the lower system layer after the modifications to the upper system layer. In an example, watcher service 145 creates a second snapshot of the upper system layer (block 524). In an example, watcher service 145 may then compare the first snapshot and the second snapshot. For example, watcher service 145 may create a delta file including the differences between the first snapshot and the second snapshot. Watcher service 145 may then forward the differences between the first and second snapshots to security inspection service 140 as a requested modification to persistent storage 155 (block 528). In an example, security inspection service 140 may then determine that container 150 is in a low threat level threatening state based on detecting an exploit in the requested modification (block 530).

Upon assigning a low threat level threatening state to container 150, security inspection service 140 may instruct container engine 160 to migrate container 150 to a new host in a low security zone (block 532). In an example, container engine 160 may then instruct container 150 to pause execution (block 534). Container engine 160 may then instruct persistent storage 155 to transfer the full contents of both the upper and lower system layers of persistent storage 155 to a new persistent storage on the new host in the low security zone (block 536). In an example, persistent storage 155 replicates its contents to the new persistent storage and self-terminates (block 538). Container engine 160 may then cause container 150 to relaunch on the new host and attach the new persistent storage to the relaunched container 150 (block 540). In an example, container engine 160 may coordinate the relaunching of container 150 with a second container engine executing on the new host. In an example, container 150 may resume execution seamlessly on the new host after the new persistent storage is attached. In an example, watcher service 145 may also continue execution after container 150 is relaunched. In the example, watcher service 145 may create a third snapshot of the upper system layer on the new persistent storage as a new baseline for comparison for any future changes to the new persistent storage (block 550).

FIG. 6 is a block diagram of an example security introspection and remediation system according to an example of the present disclosure. Example system 600 includes processors 620 communicatively coupled with memory 630, with a container 650 executing on processors 620. The container 650 is launched from an image file 651. A persistent storage 655 in memory 630 is associated with container 650 and includes a lower system layer 659, which is write protected, and an upper system layer 657. Example system 600 may additionally include security inspection service 640, watcher service 645, and container engine 660.

In an example, watcher service 645 creates a first snapshot 680 of upper system layer 657. Watcher service 645 may then detect a request 675 by container 650 to modify data 658 in persistent storage 655. In an example, watcher service 645 forwards requested modification 677 to the security inspection service 640. In an example, security inspection service 640 may determine, a threat state 670 of the container 650 based on the requested modification 677, where the threat state 670 is one of a threatening state 671 and a non-threatening state 672. In an example, in response to determining that the container 650 is in the non-threatening state 672, watcher service 645 may be notified via notification 691 that requested modification 677 is non-threatening 692, and watcher service 645 then may create snapshot 682 of the upper system layer 657. In an example, in response to determining that the container 650 is in the threatening state 671, security inspection service 640 may instruct via instruction 690, container engine 660 to respond to threatening state 671. The container engine 660 may then send response 695 to container 650.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system of detecting security threats in executing containers, the system comprising:
   one or more processors communicatively coupled with a first memory;
   a container executing on the one or more processors, wherein the container is launched from an image file;
   a first persistent storage in the first memory associated with the container including a lower system layer, which is write protected, and an upper system layer;
   a security inspection service;
   a watcher service; and
   a container engine, wherein the one or more processors:
   create, by the watcher service, a first snapshot of the upper system layer;
   detect, by the watcher service, a first request by the container to modify data in the first persistent storage;
   forward, by the watcher service, a first requested modification to the security inspection service;
   determine, by the security inspection service, a threat state of the container based on the first requested modification, wherein the threat state is one of a threatening state and a non-threatening state; and
   responsive to determining that the container is in the non-threatening state:
      notify the watcher service that the first requested modification is non-threatening, wherein the threat state of the container is determined to be non-threatening based on one of (i) a failure to detect any abnormality in the first requested modification, and (ii) all detected abnormalities in the first requested modification being listed in a list of allowable abnormalities; and
      create, by the watcher service, a second snapshot of the upper system layer; and
   responsive to determining that the container is in the threatening state, instruct, by the security inspection service, the container engine to respond to the threatening state.

2. The system of claim 1, wherein the first requested modification is written to the upper system layer.

3. The system of claim 2, wherein the watcher service determines contents of the first requested modification based on comparing the first snapshot of the upper system layer to the upper system layer after the first requested modification is written.

4. The system of claim 2, wherein the first requested modification is forwarded to the watcher service upon receipt of the first request, and the first requested modification is written to the upper system layer after the container is notified that the first requested modification is non-threatening.

5. The system of claim 4, wherein a second requested modification is queued by the container pending notification that the first requested modification is non-threatening.

6. The system of claim 1, wherein the watcher service monitors modifications to a subset of the files in the upper system layer, wherein the subset of the files is configured based on a threat tolerance and a change to a file outside of the subset of the files is ignored by the watcher service.

7. The system of claim 1, wherein a second request associated with a second requested modification, and a third request associated with a third requested modification are received by the container prior to the security inspection service determining the threat state of the container based on the first requested modification.

8. The system of claim 7, wherein the watcher service combines the second requested modification and the third requested modification into a fourth requested modification to forward to the security inspection service to determine the threat state of the container based on the fourth requested modification.

9. The system of claim 8, wherein the second requested modification and the third requested modification are combined into the fourth requested modification based on at least one of (i) the watcher service awaiting a notification that the first requested modification is non-threatening, (ii) a threshold time between forwarded requested modifications from the watcher service to the security inspection service, and (iii) an update time window to capture potentially related requested modifications.

10. The system of claim 9, wherein the security inspection service is located across a network from the container.

11. The system of claim 1, wherein a threat level of the container in the threatening state is one of low, medium, and high.

12. The system of claim 11, wherein the container engine responds to a container in the low threat level threatening state by allowing the first requested modifications to be retained, and by migrating the container to a second memory including migrating the first persistent storage to a second persistent storage in the second memory.

13. The system of claim 11, the container engine responds to a container in the medium threat level threatening state by restoring the first snapshot of the upper system layer and discarding the first requested modification.

14. The system of claim 11, the container engine responds to a container in the high threat level threatening state by terminating the container.

15. The system of claim 1, wherein the watcher service executes on one of the container and a host of the container.

16. The system of claim 1, wherein the first requested modification is written to the upper system layer prior to the watcher service forwarding the first requested modification to the security inspection service.

17. The system of claim 1, wherein the security inspection service receives requested modifications from a plurality of watcher services, each watcher service being associated with a respective container; and
  a threat definition of the security inspection service is updated without modifying any one of the plurality of watcher service and any one of the associated respective containers.

18. A method of detecting security threats in executing containers, the method comprising:
  creating, a first snapshot of an upper system layer of a persistent storage associated with a container, wherein the persistent storage includes a lower system layer, which is write protected, and the upper system layer;
  detecting, a first request by the container to modify data in the first persistent storage;
  forwarding, a first requested modification to a security inspection service;
  determining, a threat state of the container based on the first requested modification, wherein the threat state is one of a threatening state and a non-threatening state; and
  responsive to determining that the container is in the non-threatening state:
    notifying the container that the first requested modification is non-threatening; and
    creating, a second snapshot of the upper system layer; and
  responsive to determining that the container is in the threatening state, instructing a container engine to respond to the threatening state, wherein a threat level of the container in the threatening state is one of low, medium, and high, and wherein the container engine responds to a container in the low threat level threatening state by allowing the first requested modifications to be retained, and by migrating the container to a second memory including migrating the first persistent storage to a second persistent storage in the second memory.

19. A computer-readable non-transitory storage medium storing executable instructions of detecting security threats in executing containers, which when executed by a computer system, cause the computer system to:
  create, a first snapshot of an upper system layer of a persistent storage associated with a container, wherein the persistent storage includes a lower system layer, which is write protected, and the upper system layer;
  detect, a first request by the container to modify data in the first persistent storage;
  forward, a first requested modification to a security inspection service;
  receive, by the container, prior to a security inspection service determining a threat state of the container based on the first requested modification, a second request associated with a second requested modification, and a third request associated with a third requested modification; and
  combine the second requested modification and the third requested modification into a fourth requested modification to forward to the security inspection service to determine the threat state of the container based on the fourth requested modification, wherein the second requested modification and the third requested modification are combined into the fourth requested modification based on at least one of (i) a watcher service awaiting a notification that the first requested modification is non-threatening, (ii) a threshold time between forwarded requested modifications from the watcher service to the security inspection service, and (iii) an update time window to capture potentially related requested modifications;
  determine, the threat state of the container based on the first requested modification, wherein the threat state is one of a threatening state and a non-threatening state; and responsive to determining that the container is in the non-threatening state:
  notifying the container that the first requested modification is non-threatening; and
  creating, a second snapshot of the upper system layer; and
responsive to determining that the container is in the threatening state, instructing a container engine to respond to the threatening state.

* * * * *